United States Patent Office 3,562,216
Patented Feb. 9, 1971

3,562,216
PROCESS OF MANUFACTURE OF POLYETHER UREAS AND THIOUREAS PREPARED BY REACTING HEMIFORMALS OF POLYVALENT ALCOHOLS WITH UREA OR THIOUREA
Hans von Portatius, Marl, Germany, assignor to Chemische Werke Hüls Aktiengesellschaft, Marl, Germany, a corporation of Germany
No Drawing. Filed July 13, 1965, Ser. No. 471,761
Claims priority, application Germany, July 24, 1964, C 33,485
Int. Cl. C08g 9/10, 9/34
U.S. Cl. 260—51.5
30 Claims

ABSTRACT OF THE DISCLOSURE

Polyether urea and thiourea condensation products produced by the action of hemiformals of polyvalent alcohols, possibly in mixtures with hemiformals of monovalent alcohols, with urea and/or thioruea, and in the presence of acid or basic catalyst.

This application relates to new and improved polyether urea resins and the process of manufacture.

It is an object of the present invention to produce new polyether urea resins by the reaction of hemiformals with urea or thiourea.

Further objects of the present invention are to provide polyether resins with new and unexpected results over the prior art polyether urea resins.

An object of the present invention is to provide a process for the manufacture of polyether urea resins.

The prior art manufacture of urea resins, thiourea resins, urea-formaldehyde resins and thiourea-formaldehyde resins is disclosed in Kirk-Othmer "Encyclopedia of Chemical Technology," vol. 1 (1947), in the section entitled "Amino Resins and Plastics," on pages 741–769, with particular emphasis on urea and thiourea, pp. 743–744, and urea-formaldehyde condensates, pp. 747–749.

Because of their unusually easy method of preparation, the new polyether ureas of the present invention are valuable contributions to technology. Although the prior art has suggested the reaction of dimethylol-urea with monoacetals (U.S. Pat. 2,187,081), the latter process does not teach that urea alone can be used as the starting substance for the production of hardenable products of high molecular weight, nor does it make use of the advantageous properties of the hemiformal. It only discloses a technically unsatisfactory etherification process.

The precondensates of these resins are especially valuable because of their great solubility in water, alcohols, chlorinated hydrocarbons, ethers and ketones producing solutions which are used as hardenable lacquers which are very adherent because of their abundance of polar hydroxyl groups. They are also very compatible with alkyd resins.

The new pure and modified polyetherureas are exceptionally suitable for the production of casting resins, moulding materials, lacquers and adhesives. They are used advantageously for paper sizing and textile impregnation.

Because of their compatibility with the usual low molecular weight condensation resins, they are used as additives or modifiers for admixture to the usual airdrying and fire-hardening lacquers and plastics.

During the production of urea-formaldehyde resins there is known to be first a formation of mono- or bismethylol compounds of urea

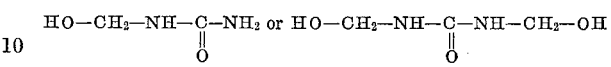

which then during hardening are converted into condensates of higher molecular weight with the liberation of water and generally with the formation of methylene bridges

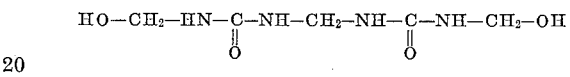

occasionally methylene ether bridges

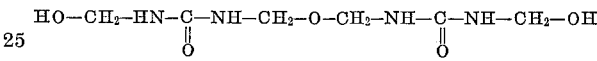

will also occur, especially if the concentration of the formaldehyde is higher than would correspond to the ratio of formaldehyde:urea=1:1.

It is also known that precondensates of urea and formaldehyde which were obtained by the alkaline method and which consist mainly of mono- or bis-methylols of urea, can be converted at normal temperature or upon warming into ethers by the formation of the group —NH—CH$_2$—O—R wherein R is an aliphatic group.

With increasing degree of etherification it becomes increasingly more difficult to harden the products by the action of heat and/or acid because there is then an ever diminishing number of N-methylol groups which are needed for further condensation. A compromise must then be decided upon.

It has now been found that polyether-ureas can be produced in a very simple manner if one or more mono- or polyvalent hemiformals of polyvalent alcohols, possibly in mixtures with hemiformals of monovalent alcohols, with urea and/or thiourea, are reacted in the presence of acid or basic catalysts.

Suitable hemiformals are produced from mono- or polyvalent alcohols and formaldehyde, with or without a catalyst by processes of the applicant of the present application disclosed in copending applications filed on the same day as the present application, and entitled "O-Hemiacetals of Formaldehyde and Catalytic Process of Manufacture," Ser. No. 471,744, and "O-Hemiacetals of Formaldehyde and Process of Manufacture," Ser. No. 471,759. These new products although not claimed in this application, have e.g., the constitution

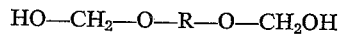

where R is a bivalent alcohol group.

According to application Ser. No. 471,744, it has been found that O-hemiacetals of formaldehyde can be obtained in a very simple manner by slowly introducing pure formaldehyde into a possibly substituted and high molecular mono- or polyhydric alcohol while the mixture is cooled in such a manner that the reaction temperature is kept at least 20° C. and preferably 50 to 110° C. above the boiling point of the pure formaldehyde and the concentration of the free formaldehyde during the reaction does not exceed 8%, preferably not 5%.

A suitable pure formaldehyde must not contain more than 0.002% water and must be sufficiently free from impurities such as formic acid that it will not polymerize.

The formaldehyde, which can be diluted with an inert gas such as nitrogen, is kept above the boiling point of the monomeric formaldehyde (−21° C.) while being introduced in the gaseous condition into the alcohol.

It is especially surprising that by the method of application Ser. No. 471,744 hydroxyl groups can be converted by formaldehyde into hemiformals which in high molecular weight compounds are either at the end of the molecule, or preferably on side chains, without the production of any cross-linking, and where the hydroxyl group can be either primary, secondary or tertiary. For this purpose the high molecular weight compounds must be either liquid at room temperature, or must be soluble in inert solvents such as benzene, toluene, chloroform, carbon tetrachloride, cyclohexane, dimethyl-sulfoxide or cyclical acetals such as 1,3-dioxolane or its homologues. High molecular weight compounds suitable for reacting with formaldehyde while dissolved in the above solvents are polyesters, preferably condensates of divalent acids with trimethylol-propane, glycerol, polyether, polythio-ether, polycarbonates, saponified copolymers of vinyl acetate with vinyl chloride, styrene, butadiene, vinylidene chloride, acrylic esters, methacrylic esters and acrylic nitrile, maleic anhydride, etc. Hydrogenated ketone- formaldehyde resins are also eminently suitable, as well as copolymers which can have glycidol, endomethylene-tetrahydrobenzyl alcohol or allyl alcohol as their alcoholic component. The hydroxyl content can vary widely, from 0.001 to 80%, preferably from 0.05 to 50%, without the occurrence of cross-linking or the formation of complete cyclic acetals.

It has been found advantageous to perform the formaldehyde-alcohol reaction between 0° and 140° C., preferably between 30° and 130° C., but especially between 40° and 100° C. Under normal conditions solid alcohols and phenols are preferably used in their liquid phase if their melting points are not higher than about 110° C., and their viscosity in melted condition is not too high to permit vigorous stirring during the addition of the monomeric formaldehyde. Higher melting compounds are preferably dissolved in one of the above-mentioned solvents which will dissolve the alcohol in higher concentrations, and the formaldehyde is then permitted to react with alcohol at lower temperatures.

The formation of O-hemiformals generally occurs with only moderate speed, and is especially slow at temperatures below 0° C. where higher local formaldehyde concentrations will be formed which will cause undesired side reactions such as the addition of another formaldehyde molecule to an already present hemiformal molecule so as to produce the known polyhemiformal mixtures mixed with free alcohol. At lower temperatures there may also be the formation of considerable paraformaldehyde which will separate out. Too high local concentrations of formaldehyde can also result from too rapid an addition of monomeric formaldehyde. For this reason the formaldehyde is added slowly and in only such amounts as will react promptly, while the mixture is being vigorously stirred to ensure uniform distribution of the aldehyde. It is best to keep the entire system under a partial vacuum whereby local concentrations of formaldehyde will be kept below 1%. The same result is produced by increasing the reaction temperature. By increasing the partial vapor pressure of the formaldehyde with the temperature (at 40° C. about 5 atm.), the solubility of the free formaldehyde in the corresponding alcohol will at the same time be diminished, so that the only remaining formaldehyde will be that which is combined as a hemiformal. In a few cases, e.g. in the conversion of glycerol or cyclohexanedimethanol, the reaction with formaldehyde does not occur until a temperature above 80° C. is reached, namely in cases where the individual hydroxyl groups are screened off too much by hydrogen bonds. The introduction of the monomeric formaldehyde is rapid enough to produce in each case a quantitative conversion.

During the hemiformal formation large quantities of heat are liberated and removed by effective cooling, such as water bath circulation.

Suitable bivalent alcohols are, e.g. glycol, propylene glycol-1,2, propylene gylcol-1,3, butane-diol-1,3, butane-diol-1,4, pentane-diol-1,5, 2,2-dimethylpropane-diol-1,3, 1,4-butane-diol, hexane-diol-(1,6), decane-diol-(1,10), diethylene glycol, triethylene glycol, thiodiglycol, diethanolamine, thiodiglycolsulfoxide, 3 - amino - 2,5-dimethylhexane-diol-(2,5), 3,5-bis-(oxy-isopropyl)-pyridine, butenediol-1,4, hexadiene-(2,4)-diol-(1,6), and other diols which have a double or triple bond in the carbon chain.

Other suitable diols are cyclohexane-diol-(1,4), 2,5- or 2,6-norbornene-diol, 2,2,3,4-tetramethyl-1,3-cyclobutanediol, cis-, trans-, and 1:1-cis/trans mixtures of 2,2,4,4-tetramethyl-1,3-cyclohexane-dimethanol-1,4, also diols of the structure

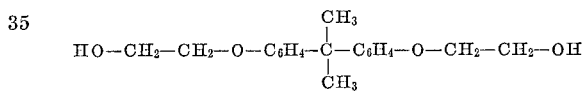

or

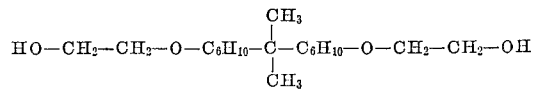

Divalent phenols are also suitable, such as pyrocatechol, resorcinol, hydroquinone and p,p'-dioxy-diphenyl-dimethyl-methane.

Polyols of higher valence can also be used, e.g. glycerol, hexane-triol, dioxyacetone, penta-erythrit and polyvinyl alcohol, triethanol-amine, pyragallol, oxyhydroquinone, polyethylene glycol and polypropylene glycol.

The new polyether-ureas can be easily obtained by heating a mixture of urea and a polyvalent hemiformal with some added acid, whereupon the urea goes into solution before polycondensation commences. At temperatures below 60 to 90° C., liquid precondensates are generally formed which harden above 100° C.

Suitable temperatures for the precondensation are generally between 15 and 90° C., preferably in the range of 30 to 65° C., but the reaction occurs, although slowly, below 15° C., e.g. at 8° C.

Suitable catalysts are, e.g. concentrated sulfuric acid, perchloric acid, hydrochloric acid, hydrobromic acid, p-toluene-sulfonic acid, or also acid salts of polybasic acids, e.g. potassium-hydrogen-sulfate, sodium-dihydrogen-phosphate and also Lewis acids, e.g. $BF_3$, $BF_3$-etherate, $SnCl_4$, $FeCl_3$ and oxonium fluoborate. Especially suitable are substances from which protons are liberated only at higher temperatures and with thermal decomposition if the hardening is to occur only at such higher temperatures. Among such substances are to be mentioned acid salts of ammonia, e.g. ammonium chloride, ammonium hydrogen sulfate and diazonium fluoborates, e.g. benzene-diazonium fluoborate, p-nitrophenyl-diazonium-fluoborate and butadien-sulfone. The acid catalysts are used in amounts of 0.0001 to 5%, preferably 0.01 to 3%, relative to the weight of the urea. The choice of the acid catalyst depends on whether a rapid or a slow condensation reaction is desired. With concentrated sulfuric acid, perchloric acid or boron-fluoride-etherate the reaction is extremely rapid, but occurs at a more moderate speed with p-toluene sulfonic acid. It is also possible to perform the preliminary condensation in an alkaline medium and then harden the substance in an acid medium. As alkaline catalysts, use can be made or sodium- or potassium hydroxide in finely divided solid form or in concentrated aqueous solution, calcium hydroxide, barium hydroxide, sodium carbonate, potassium carbonate, magnesium carbonate, etc. The basic catalysts are used in amounts of 0.01 to 3% relative to the urea. The use of basic catalysts has the advantage that the bis-hemiformals are reacted in a medium in which they exist largely in the free form in which they are naturally more stable.

Under the reaction conditions of the process disclosed in application Ser. No. 471,759, catalysts will greatly accelerate the formation of hemiformals and in some cases will make their production possible.

Suitable catalysts which can be used in amounts of 0.00001% to 2% relative to the weight of the added alcohol are especially the tertiary, secondary and primary amines such as triethylamine, tri-n-butylamine, pyridine, piperidine, diethyl-amine, cyclohexyl-methylamine, butylamine, N-methylaniline, cyclohexylamine, isoamylamine and tri-n-octylamine, phosphines such as triphenylphosphine and tri-n-butylphosphine, stibines such as tri-n-butyl-stibine, arsines such as tri-n-butylarsine, and the quaternary ammonium compounds such as tetramethyl ammonium bromide.

The catalyst is preferably introduced into the alcohol, whereupon the formaldehyde is added. The reaction, which occurs with the liberation of heat and which therefore requires effective cooling, succeeds especially well if the formaldehyde is introduced in gaseous form. In reactions which are preferred at temperatures below the boiling point of monomeric formaldehyde (−21° C.), the formaldehyde is introduced in liquid form, only at the rate at which it is used up. With the greatly increased reaction velocity resulting from the use of the catalyst, it is now possible in technical processes to introduce the formaldehyde at a rate which would ordinarily be difficult or impossible without danger of producing undesired side-products such as paraformaldehyde.

For the same reason, it is advantageous to quickly disperse the introduced formaldehyde by rapid stirring.

The reaction is advantageously performed at temperatures between −100 and +150° C., preferably between −20 and +130° C., and best at 30° C.

Especially pure O-hemiacetals are obtained if a pure water-free formaldehyde is introduced which is sufficiently free from ionized impurities not to polymerize.

The formaldehyde can, if desired, be diluted with an inert gas such as nitrogen, argon, neon, xenon and krypton.

It is also generally possible to produce precondensates without catalysts. For this purpose higher condensation temperatures between 90 and 110° C. are generally necessary, and the time required is generally longer than with catalysts.

The reaction is generally performed by bringing the components to be condensed into the presence of the catalyst and then by the application of heat producing a precondensate, or by continued application of heat to effect complete hardening. By using more catalyst than is necessary to initiate the reaction, a hardened product can be produced in a strongly exothermic reaction.

To ensure the production of a precondensate with uniform properties, it is advisable to keep the reaction mixture in uniform motion. The condensation is generally performed in the presence of air whereby colorless products are always obtained. If, however, the hemiformal component contains a group which undergoes auto-oxidation, especially at high temperatures, as e.g. a nitrogenous group, and then the work is preferably done in an inert atmosphere, e.g. in nitrogen.

It is also possible however to work with solutions. The condensation in solvents is especially advantageous if precondensates which are viscous at room temperature are applied in the thinnest possible layers, e.g. as lacquers, and are then allowed to harden. Such a liquid form of the precondensate is used for coating paper and for impregnating textiles. Suitable for use as solvents are all substances which readily dissolve at least one of the component intended for condensation and is compatible with the other. Suitable solvents are water, alcohols, alcohol-water mixtures, dimethyl-formamide, dimethyl-sulfoxide and benzene. The addition of water is restricted by the fact that water contents higher than 35% of the mass of reactable components cause an appreciable degree of dissociation of the hemiformal into its alcoholic and formaldehyde components whereby urea-formaldehyde resins of the conventional kind with only a partial polyether structure are obtained, together with free hydroxyl groups which can be used for other reactions.

The O-hemiformals obtained are stable, water-clear, limpid to viscous liquids, miscible with alcohols such as methanol, ethanol, propanol, etc., with aromatics such as benzene and toluene, with ethers such as diethyl ether and with halogenated hydrocarbons such as chloroform, carbon tetrachloride, trichlorethylene and methylene chloride. If the diol component is miscible with water, then the corresponding O-hemiformals are also soluble in water.

The new process makes it possible, within very wide limits, to vary the properties of the poly-ether-ureas in accordance with the diol or polyol component that is used, and to vary the ratio used for hemiformal:urea. If, for example, hemiformals are chosen which have only a relatively small proportion of paraffinic hydrocarbons, e.g. glycol, then the product is very hard and relatively brittle. The same is true of aromatic or a bulky cyclo-aliphatic formal. Hemiformals with a relatively large proportion of paraffinic hydrocarbons as, e.g. hexylene-glycol-(1,6)-bisformal on the contrary give soft elastic materials so that by the choice of hemiformal components alone it is possible with the given molar ratio of 1:1 to provide hardness and elasticity. It is also possible, however, with a given hemiformal by changing the molar ratio from bis-hemiformal to urea from 0.2:4.0 and 4.0:0.2 to vary the hardness and the elasticity. For example, with a molar ratio of bis-formal to urea of 2:1, this is no longer a reaction of all the hemiformal groups with the urea. During hardening with acids, the hemiformals instead become crosslinked with the liberation of water to form complete acetal bridges producing clear, soft and elastic materials.

Another possibility by which the properties of the products can be varied consists of the simultaneous condensation of two or more bis- or polyformals with urea, whereby the relative amounts can be varied within wide limits. If, therefore, a potentially hard hemiformal is combined with a potentially soft hemiformal, then their condensation with urea produces a final product which is both hard and elastic.

The 1:1 precondensates of bis- or poly-hemiformals with urea in the presence of basic catalysts are generally clear, colorless, practically odorless viscous liquids if produced by quick heating of the components between 40 and 60° C. They are miscible in all proportions with polar solvents such as water, alcohols, dimethyl-formamide, dimethyl-sulfoxide, etc. If, however, the components are heated over longer periods of time in the presence of alkaline catalysts to temperatures between 60 and 100° C., then at these temperatures the products will be viscous liquids which become waxlike to solid precondensates at room temperature which can be hardened exactly like the precondensates which are liquid at room temperature, either by themselves or in mixtures with fillers such as cellulose, or wood flour, by mixing the material with acid catalysts and filling it into heated moulds to produce solid bodies.

The proportion of polyether can be considerably increased by condensing bis- or poly-hemiformals in admixtures with mono-hemiformals of monovalent alcohols with urea. Suitable mono-hemiformals can be derived from methanol, ethanol, n-propanol, iso-propanol, n-butanol, isobutyl alcohol, tert.butyl alcohol, n-amyl alcohol, iso-amyl alcohol, n-hexyl alcohol, n-heptanol, n-octanol, n-decyl alcohol, lauryl alcohol, myristyl alcohol, benzyl alcohol, cyclo-hexanol, diethylene-glycol-monoethyl-ether, triethylene-glycol-monoethyl-ether, triethylene-glycol-monobutyl-ether, phenol, o-, m- and p-cresol, o-, m- and p-chlorphenol, p-brom-phenol, o-, m- or p-nitrophenol, guaiacol, cyclohexanol, eugenol, saligenin, o-, m-, p-oxyacetophenone, salicycaldehyde and o-cyclohexyl-phenol.

Suitable modifying agents also include the monohemiformals of polyvalent alcohols, e.g. glycol-monohemiformal, propane-diol-(1,3)-hemiformal, butane-diol-(1,3)-hemiformal, butane-diol-(1,4)-hemiformal, glycerol-monohemiformal, trimethylol-propane-monohemiformal, 2,2-dimethylpropane-diol-(1,3)-hemiformal, cyclohexane-dimethanol-(1,4)-hemiformal and resorcinol-monohemiformal. These substances are suitable in their pure condition and in mixtures as when a polyvalent alcohol is reacted with less formaldehyde than its stoichiometric amount, e.g. 1 mole glycol with 1 mole formaldehyde. In each case poly-ether-ureas will be formed in which the degree of etherification will increase with diminished precondensation and which will also contain free alcohol groups.

The specific examples of application Ser. No. 471,744 disclose the preparation of the hemiformals of propanol, n-butanol, 2-ethylhexanol, laurylalcohol, cyclohexanol, sec-butanol, allylalcohol, propyleneglycol monoacrylate, endomethylene-tetrahydrol-benzyl-alcohol, phenol, glycidol, propargyl-alcohol, glycol, butadiene-1,4 diethyleneglycol, thiodiglycol, glycerol, trimethylolpropane, triethanolamine and butene-2-diol-1,4.

Application Ser. No. 471,759 discloses in the specific examples the preparation of the hemiformals of n-propanol, cyclohexanol, lauryl alcohol, sec-butanol, 2-ethylhexane-diol-1,3, propylene-glycol-mono-acrylate, butane-diol-1,4-glycerol, cyclohexane-dimethanol, butanol and resorcin.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLES 1–14

In a beaker equipped with stirrer, thermometer and external heater, the bis- or poly-hemiformal components (see Table I), together with a previously prepared and warmed mixture of urea and catalyst are mixed as long as the indicated temperature can be maintained within the time limits specified. Solid blocks consisting of polyether ureas are produced, which are generally difficult to comminute.

TABLE 1.—POLYCONDENSATION OF BIS- OR POLY-HEMIFORMALS WITH UREA OR THIOUREA IN THE PRESENCE OF ACID CATALYSTS

| Number | Bis- or poly-hemiformal components Type | Parts | Urea parts | Catalyst Type | Parts | Condensation Temp., °C. | Time, min. | Condition of the resin | Remarks |
|---|---|---|---|---|---|---|---|---|---|
| 1 | Glycol-bis-hemiformal | 23 | 15 | p-Toluene sulfonic acid | 0.1 | 70–120 | 80 | White, very hard, brittle | |
| 2 | Diglycol-bis-hemiformal | 41.6 | 15 | ...do | 0.1 | 40–120 | 120 | Colorless, tenacious, elastic | |
| 3 | Cyclohexane-1,4-dimethanol-bis-hemiformal | 51 | 15 | ...do | 0.1 | 70–125 | 70 | White, tenacious, elastic, shearable | |
| 4 | Butane-diol-(1,4)-bis-hemiformal | 35 | 15 | Conc. H₂SO₄ | 0.02 | 40–135 | 15 | Colorless, tenacious, elastic | At 50° temp. jump to 110° C. with formation of a solid block. |
| 5 | Glycol-bis-emiformal | 30.5 | 15 | 70% HClO₄ | 0.05 | 40–120 | 10 | White, hard, brittle | |
| 6 | ...do | 30.5 | 15 | Conc. H₂SO₄ | 0.05 | 40–120 | 10 | ...do | |
| 7 | ...do | 30.5 | 15 | BF₃-etherate | 0.0001 | 40–120 | 15 | ...do | |
| 8 | 2-methyl-pentane-diol-(2,4)-bis-hemiformal | 44.5 | 15 | p-Toluene sulfonic acid | 0.01 | 40–140 | 90 | Colorless, very soft and elastic | Produced under N₂, soluble in water. |
| 9 | Triethanol-amine-tris-hemiformal | 59.8 | 22.5 | ...do | 0.2 | 40–130 | 90 | Colorless, tenaciously soft when warm, hard when cold | |
| 10 | Thiodiglycol-bis-hemiformal | 45.6 | 15 | ...do | 0.01 | 40–135 | 120 | White, elastic | |
| 11 | Glycerol-tris-hemiformal | 45.5 | 22.5¹ | ...do | 0.02 | 40–120 | 70 | White, very hard, brittle | |
| 12 | Resorcinol-bis-hemiformal | 42.5 | 15 | Conc. H₂SO₄ | 0.1 | 30–110 | 3 | Orange, very hard, brittle | At 30° spontaneous exothermic reaction. |
| 13 | Poly-ethylene-glycol-bis-hemiformal (MG 460) | 115 | 15 | ...do | 0.05 | 50–140 | 80 | Colorless, very elastic | |
| 14 | Butane-diol-bis-hemiformal-(1,4) | 35 | 19.05 | ...do | 1.1 | 40–120 | 80 | White, soft, tenacious | |

¹ Thiourea.

EXAMPLES 15–19

In a beaker equipped with a stirrer, thermometer and external heater, the bis- and polyhemiformal components (see Table 2) are mixed with urea and catalyst, the latter two having been previously mixed. A temperature of 60 to 68° C. is maintained 30 minutes. A clear viscous liquid is produced. The viscous liquid is hardened by heat in the presence of a basic catalyst.

EXAMPLES 24–27

In a beaker equipped with stirrer, thermometer and external heater, the bis-hemiformal components together with urea, catalyst and the solvent designated in Table 4, column 8 are mixed and warmed to the extent indicated in the condensation time and temperature columns. Colorless hard gels are obtained when the temperature is kept below the boiling point of the solvent that is used. Otherwise the solvent vaporizes (Examples 24 and 27), leaving behind a solid body which assumes either the form of a block or a lacquer coating.

TABLE 2.—PRODUCTION OF PRECONDENSATES OF BIS-AND TRIS-HEMIFORMALS WITH UREA IN THE PRESENCE OF BASIC CATALYSTS

| Number | Bis- or poly-hemiformal components | | Urea parts | Catalyst | | Condensation | | Condition of precondensate, 25° C. |
|---|---|---|---|---|---|---|---|---|
| | Parts | Type | | Parts | Type | Temp., °C. | Time, min. | |
| 15 | 35.04 | Butane-diol-(1,4)-bis-hemiformal | 15 | 0.1 | NaOH | 60 | 30 | Clear, viscous liquid. |
| 16 | 41.6 | Diglycol-bis-hemiformal | 15 | 0.05 | NaOH | 60 | 30 | Do. |
| 17 | 45.6 | Thiodiglycol-bis-hemiformal | 15 | 0.05 | KOH | 60 | 30 | Do. |
| 18 | 45.5 | Glycerol-tris-hemiformal | 22.5 | 0.05 | NaOH | 68 | 30 | Do. |
| 19 | 44.5 | 2-methyl-pentanediol-(2,4)-dihemiformal | 15 | 0.1 | NaOH | 60 | 30 | Do. |

EXAMPLES 20–23

The precondensates produced as in Examples 15–18 (Table 2) are mixed with 0.1 part conc. $H_2SO_4$ and introduced into a glass tube closed at one end. Heat is then applied from the outside at a rate sufficient to bring the temperature from 40 to 120° C. within 20–30 minutes (see Table 3). The products are hard, colorless solid bodies in the form of round bars. They are insoluble in the usual solvents such as water, alcohols, acetone, gasoline, benzene, and chlorinated hydrocarbons.

TABLE 4.—PRODUCTION OF POLYETHER-UREA IN SOLUTION

| Number | Urea, parts | Catalyst (p-toluene sulfonic acid, parts) | Condensation | | Remarks | Solvent |
|---|---|---|---|---|---|---|
| | | | Temp., °C. | Time, min. | | |
| Bis-hemiformal components: 30.5 parts glycol-bis-hemiformal | | | | | | |
| 24 | 15 | 0.1 | 40–140 | 120 | Becomes hard at 50° C | 10 parts water. |
| Bis-hemiformal components: 41.6 parts diglycol-bis-hemiformal | | | | | | |
| 25 | 15 | 0.1 | 40–100 | 90 | Colorless gel | 20 parts dimethylsulfooxide. |
| 26 | 15 | 0.1 | 40–80 | 80 | Colorless, solid gel | 20 parts dimethylformamide. |
| 27 | 15 | 0.1 | 40–110 | 100 | Solid, tenacious material | 20 parts of a mixture, consisting of 12 parts ethanol and 8 parts water. |

EXAMPLES 28–33

In a beaker equipped with stirrer, thermometer and external heater the hemiformal components of monovalent alcohols or the mono-hemiformals of polyvalent alcohols either by themselves or mixed with bis-hemiformals are mixed with urea and the catalyst mentioned in column 5, Table 5, at the temperatures and for the time period TABLE 3.—HARDENING OF PRECONDENSATES OF BIS- OR TRIS-HEMIFORMALS AND UREA WITH ACID CATALYSTS

| No. | Precondensate consisting of— | Catalyst [1] for the hardening, parts | Hardening temp., °C. | Hardening time, minutes |
|---|---|---|---|---|
| 20 [2] | 35.04 parts butane-diol-(1,4)-bis-hemiformal plus 15 parts urea | 0.1 | 50–120 | 25 |
| 21 [2] | 41.6 parts diglycol-bis-hemiformal plus 15 parts urea | 0.1 | 50–110 | 20 |
| 22 [3] | 45.6 parts thiodiglycol-bis-hemiformal plus 15 parts urea | 0.1 | 40–110 | 30 |
| 23 [2] | 45.6 parts glycerol-tris-hemiformal plus 22.5 parts urea | 0.1 | 50–120 | 30 |

[1] Conc. $H_2SO_4$.
[2] At 60° C. already hardens.
[3] At 50° C. already hardens.

specified in columns 6 and 7. Clear viscous precondensates (Example 31) or solid elastic polyether-ureas with increased proportions of ether (Examples 28–30) are obtained.

TABLE 5.—POLYCONDENSATION OF HEMIFORMALS OF MONOVALENT ALCOHOLS OR MONO-HEMIFORMALS OF POLYVALENT ALCOHOLS, BY THEMSELVES WITH UREA, OR IN ADMIXTURE WITH BIS-HEMIFORMALS

| Number | Urea, parts | Catalyst, parts | Condensation Temp., °C. | Time, min. | Condition of the resin | Remarks: solidifies at— |
|---|---|---|---|---|---|---|
| Hemiformal components: 23 parts glycol-mono-hemiformal; bis-hemiformal components: 35 parts butane-diol-(1,4)-bis-hemiformal | | | | | | |
| 28 | 30 | ¹ 0.02 | 40–120 | 70 | Hard, white block | 85° C. |
| Hemiformal components: 23 parts n-butyl-hemiformal; bis-hemiformal components: 17.5 parts butane-diol-(1,4)-bis-hemiformal | | | | | | |
| 20 | 15 | ¹ 0.01 | 50–110 | 60 | Hard, white block | 95° C. |
| Hemiformal components: 23 parts glycol-mono-hemiformal; bis-hemiformal components: 30.5 parts glycol-bis-hemiformal | | | | | | |
| 30 | 30 | ¹ 0.02 | 50–120 | 60 | Hard, white block | 80° C. |
| Hemiformal components: 23 parts glycol-mono-hemiformal | | | | | | |
| 31 | 15 | ² 0.1 | 60–90 | 60 | Clear, viscous solution | |
| 32 | 15 | ¹ 0.01 | 50–70 | 15 | Solid substance at room temperature. | |
| 33 | 15 | ³ 0.05 | 60–70 | 10 | Solid block | |

¹ Conc. H₂SO₄.
² NaOH.
³ p-Toluene sulfonic acid.

What is claimed is:
1. A polyether-urea process consisting essentially of:
(a) reacting a compound selected from the group consisting of urea and thiourea with
(b) a hemiformal selected from the group consisting of monovalent hemiformals of polyvalent alcohols, polyvalent hemiformals of polyvalent alcohols, mixtures of monovalent hemiformals of polyvalent alcohols with hemiformals of monovalent alcohols, mixtures of polyvalent hemiformals of polyvalent alcohols with hemiformals of monovalent alcohols and mixtures thereof in presence of
(c) a catalyst selected from the group consisting of acids and bases.
2. The process of claim 1, wherein the reaction takes place at a temperature between 15 and 90° C.
3. The process of claim 1, wherein the reaction takes place at a temperature between 30 and 65° C.
4. The process of claim 1, wherein the catalyst of (c) is an acid having a concentration of 0.0001 to 5% relative to the weight of urea.
5. The process of claim 1, wherein the catalyst of (c) is a base having a concentration of 0.01 to 3% relative to the weight of urea.
6. A polyether-urea process consisting essentially of:
(a) reacting at a temperature between 90 and 110° C. a compound selected from the group consisting of urea and thiourea with
(b) a hemiformal selected from the group consisting of monovalent hemiformals of polyvalent alcohols, polyvalent hemiformals of polyvalent alcohols, mixtures of monovalent hemiformals of polyvalent alcohols with hemiformals of monovalent alcohols, mixtures of polyvalent hemiformals of polyvalent alcohols with hemiformals of monovalent alcohols and mixtures thereof.
7. The process of claim 1, wherein the molar ratio of (b) to (a) is approximately 0.2:4.0 to 4.0:0.2.
8. The process of claim 6, wherein the molar ratio of (b) to (a) is approximately 0.2:4 to 4.0:0.2.
9. A polyether-urea resin condensation product consisting essentially of
(a) a compound selected from the group consisting of urea and thiourrea with
(b) a hemiformal selected from the group consisting of monovalent hemiformals of polyvalent alcohols, polyvalent hemiformals of polyvalent alcohols, mixtures of monovalent hemiformals of polyvalent alcohols with hemiformals of monovalent alcohols, mixtures of polyvalent hemiformals of polyvalent alcohols with hemiformals of monovalent alcohols and mixtures thereof.
10. A polyether-urea resin condensation product consisting essentially of urea and glycol-bis-hemiformal.
11. A polyether-urea resin condensation product consisting essentially of thioruea and glycol-bis-hemiformal.
12. A polyether-urea resin condensation product consisting essentially of urea and diglycol-bis-hemiformal.
13. A polyether-urea resin condensation product consisting essentially of thiourea and diglycol-bis-hemiformal.
14. A polyether-urea resin condensation product consisting essentially of thiourea and butane-diol-(1,4)-bis-nol-bis-hemiformal.
15. A polyether-urea resin condensation product consisting essentially of thiourea and cyclohexane - 1,4 - dimethanol-bis-hemiformal.
16. A polyether-urea resin condensation product consisting essentially of urea and butane - diol - (1,4) - bis-hemiformal.
17. A polyether-urea resin condensation product consisting essentially of urea and butane - diol - (1,4) - bis-hemiformal.
18. A polyether-urea resin condensation product consisting essentially of urea and 2 - methyl - pentane-diol-(2,4)-bis-hemiformal.
19. A polyether-urea resin condensation product consisting essentially of thiourea and 2 - methyl - pentane-diol-(2,4)-bis-hemiformal.
20. A polyether-urea resin condensation product consisting essentially of urea and triethanol - amine - tris-hemiformal.
21. A polyether-urea resin condensation product consisting essentially of thiourea and triethanol - amine - tris-hemiformal.
22. A polyether-urea resin condensation produce consisting essentially of urea and thiodiglycol - bis - hemiformal.
23. A polyether-urea resin condensation product consisting essentially of thiourea and thiodiglycol - bis - hemiformal.
24. A polyether-urea resin condensation product consisting essentially of urea and glycerol-tris-hemiformal.
25. A polyether-urea resin condensation product consisting essentially of thiourea and glycerol-tris-hemiformal.

26. A polyether-urea resin condensation product consisting essentially of urea and resorcinol-bis-hemiformal.

27. A polyether-urea resin condensation product consisting essentially of thiourea and resorcinol-bis-hemiformal.

28. A polyether-urea resin condensation product consisting essentially of urea and poly-ethylene - glycol - bis-hemiformal.

29. A polyether-urea resin condensation product consisting essentially of thiourea and poly-ethylene-glycol-bis-hemiformal.

30. A resinous polyether condensation product consisting essentially of a substance selected from the group consisting of urea and thiourea, and a substance selected from the following group:
2-methyl-pentane-diol-(2,4)-bis-hemiformal,
glycol-bis-hemiformal,
diglycol-bis-hemiformal,
cyclohexane-(1,4)-bis-hemiformal,
butane-diol-(1,4)-bis-hemiformal,
triethanol-amine-tris-hemiformal,
thiodiglycol-bis-hemiformal,
glycerol-tris-hemiformal,
resorcinol-bis-hemiformal, and
poly-ethylene-glycol-bis-hemiformal.

References Cited

UNITED STATES PATENTS

| | | | |
|---|---|---|---|
| 2,085,492 | 6/1937 | Ellis | 260—69 |
| 2,168,477 | 8/1939 | Hodgins et al. | 260—70 |
| 2,185,167 | 12/1939 | Hodgins et al. | 260—70 |
| 2,187,081 | 1/1940 | Hodgins et al. | 260—70 |
| 2,512,671 | 6/1950 | Novotny et al. | 260—69 |
| 2,722,523 | 11/1955 | Gilchrist et al. | 260—17.3 |
| 3,079,434 | 2/1963 | Christenson et al. | 260—80.73 |
| 3,278,470 | 10/1966 | Henshall et al. | 260—21 |

OTHER REFERENCES

Walker, Formaldehyde, 3rd edition, June 8, 1964, pp. 32, 44–45, 78–81, 84–85, 96–97, 136–137, 264–268, 382–384 and 391–395.

Blais, Amino Resins, pp. 8–12, 1959.

WILLIAM H. SHORT, Primary Examiner

H. SCHAIN, Assistant Examiner

U.S. Cl. X.R.

260—17.2, 17.3, 29.3, 29.4, 32.8, 33.2, 33.4, 33.6, 33.8, 69, 70, 71, 77.5, 850; 264—331